(12) United States Patent
Lan (10) Patent No.: US 10,400,161 B2
(45) Date of Patent: Sep. 3, 2019

(54) QUANTUM ROD COMPOSITION, QUANTUM ROD POLARIZER AND FABRICATING METHOD FOR THE SAME

(71) Applicant: Shenzhen China Star Optoelectronics Technology Co., Ltd., Shenzhen (CN)

(72) Inventor: Song Lan, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 301 days.

(21) Appl. No.: 15/533,999

(22) PCT Filed: Apr. 10, 2017

(86) PCT No.: PCT/CN2017/079906
§ 371 (c)(1),
(2) Date: Jun. 8, 2017

(87) PCT Pub. No.: WO2018/145358
PCT Pub. Date: Aug. 16, 2018

(65) Prior Publication Data
US 2018/0312748 A1   Nov. 1, 2018

(30) Foreign Application Priority Data

Feb. 7, 2017 (CN) .......................... 2017 1 0067467

(51) Int. Cl.
*G02B 5/30* (2006.01)
*C09K 11/02* (2006.01)
(Continued)

(52) U.S. Cl.
CPC ............ *C09K 11/025* (2013.01); *C09K 11/02* (2013.01); *C09K 11/08* (2013.01); *C09K 11/883* (2013.01);
(Continued)

(58) Field of Classification Search
CPC ....... C09K 11/02; C09K 11/025; C09K 11/08; C09K 11/54; C09K 11/565; C09K 11/883;
(Continued)

(56) References Cited

U.S. PATENT DOCUMENTS

2017/0031211 A1* 2/2017 Park .................. G02F 1/133528
2019/0129252 A1* 5/2019 Srivastava ......... G02F 1/133528

FOREIGN PATENT DOCUMENTS

| CN | 105700247 A | | 6/2016 |
| JP | 2016-069486 | * | 5/2016 |
| KR | 2014-0086058 | * | 7/2014 |

OTHER PUBLICATIONS

Computer-generated translation of KR 2014-0086058 (Jul. 2014) (Year: 2014).*

(Continued)

*Primary Examiner* — John A McPherson
(74) *Attorney, Agent, or Firm* — Leong C. Lei (57) ABSTRACT

The present invention provides a quantum rod composition, a quantum rod polarizer and a fabricating method for the same. The quantum rod composition of the present invention comprises the photo-alignment agent modified quantum rods, the polymerizable monomers, and a solvent, said photo-alignment agent modified quantum rods are capable of being oriented in arrangement under irradiation of linearly polarized light, said polymerizable monomers are capable of forming polymer network under irradiation of UV light, thereby anchoring said photo-alignment agent modified quantum rods, for retaining arrangement directions thereof. The fabricating method of quantum rod polarizer of the present invention, applies the aforementioned quantum rod composition to prepare the quantum rod polarizer with simplified fabricating process. In the fabricated quantum rod polarizer, the photo-alignment agent modified quantum rods (Continued)

are consistent and retained in arrangement directions, and have stable polarizing property. The quantum rod polarizer of the present invention makes polarizing property stable, is capable of being applied on the liquid crystal display device, raising light source utilization rate and achieving greatly higher purity light, thereby implementing high color gamut and lower power consumption of colour display.

10 Claims, 8 Drawing Sheets

(51) Int. Cl.
    *G02F 1/1335*      (2006.01)
    *C09K 11/08*      (2006.01)
    *C09K 11/88*      (2006.01)
    *B82Y 40/00*      (2011.01)
    *B82Y 20/00*      (2011.01)

(52) U.S. Cl.
    CPC ..... *G02B 5/3033* (2013.01); *G02F 1/133528* (2013.01); *B82Y 20/00* (2013.01); *B82Y 40/00* (2013.01); *G02F 1/133617* (2013.01); *G02F 2202/10* (2013.01); *G02F 2202/108* (2013.01)

(58) Field of Classification Search
    CPC ..... C09K 11/892; G03F 7/0005; G03F 7/027; B82Y 20/00; B82Y 40/00; G02F 1/133617; G02F 2202/10; G02F 2202/108; G02F 1/133528; G02F 1/133533; G02B 5/3033
    USPC ................ 430/281.1, 288.1, 321; 349/96, 97
    See application file for complete search history.

(56) References Cited

OTHER PUBLICATIONS

Computer-generated translation of JP 2016-069486 (May 2016) (Year: 2016).*

* cited by examiner

QUANTUM ROD COMPOSITION, QUANTUM ROD POLARIZER AND FABRICATING METHOD FOR THE SAME

FIELD OF THE INVENTION

The present invention relates to a display technology field, and more particular to a quantum rod composition, a quantum rod polarizer and a fabricating method for the same.

BACKGROUND OF THE INVENTION

Along with development of the technology and progression of the society, people increasingly depends day by day the aspect of information communication and transmission. And display components, which are treated as the primary carriers and physical infrastructures of the information exchange and transmission, currently become hot spots and highlands where numerous scientists engaged in information optoelectronic researches compete to seize.

The quantum dot display technology has comprehensively upgraded various dimensions of color gamut coverage, accuracy, red, green, and blue color purity, etc., which is regarded as the dominant position of the global display technology, and which it is also seen as the global display technology revolution, wherein the full color gamut display can be revolutionary accomplished, and the image colors get the most really restituted.

Quantum Dots (as so-called "QDs"), which also called semiconductor nanocrystals, are composed of binary or ternary inorganic nanoparticles from group II-VI or group III-V elements. Currently, the great researches are made primarily for binary compounds CdE of cadmium (Cd) ('E' denotes sulphur (S), selenium (Se), or tellurium (Te)). A common particle size of the quantum dot is in 2-10 nm, and different size quantum dots have different bandwidths. While a size of a quantum dot is lesser than Bohr radius of its exciton, electrons and holes of the quantum dot are confined by the quantum, the original contiguous band is transitioned into a discrete energy level structure, which can emit fluorescent light after excited.

Compared with the conventional fluorescent material, the quantum dots have a number of unique properties that: (1) an emission peak of the fluorescent light is narrow (where a common full width at half maximum thereof is in 20~30 nm) and expressed in symmetrical distribution; (2) a luminous color of the fluorescent light is adjustable; (3) an optical stability thereof is better; and (4) a lifetime of the fluorescence is longer, and its biocompatibility is great.

Nevertheless, if quantum dots are applied within a liquid crystal cell (cell) of a liquid crystal display device (TFT-LCD), it is required to make quantum dot to achieve a polarizing property, such that quantum rod (Quantum Rod, as so-called 'QR') is created. Quantum rod denotes an one-dimension material which would be affected by the quantum confinement effect in two-dimension directions, most of the nanomaterials are composed of group II-VI or group III-V elements. Due to the quantum confinement effect, transportations of electrons and holes therein are suffered with limitations to facilitate the contiguous band structure transitioning into a discrete energy level structure. When the sizes of the quantum rods are different from each other, quantum confined levels of the electrons and holes are inconsistent with each other, and the discrete energy level structures are different. After suffered with excitation of external energy, different-size quantum rods promptly emit light with different wavelengths, namely, a variety of colored lights.

The quantum rod can emit linearly polarized light, and namely, the light from the quantum rod along a length direction of the quantum rod have linear polarization. However, since expressed in a random-mode arrangement under the ordinary manner, the quantum rods can not exert its linear polarization property. Thus, for displaying industry, it is a significant focus on the research of how to make the quantum rods in the liquid crystal cell to reach a stabilized orientation arrangement.

SUMMARY OF THE INVENTION

An objective of the present invention is to provide a quantum rod composition which is applicable to prepare a quantum rod polarizer, and the prepared quantum rod polarizer has a stable polarizing property.

An objective of the present invention is to further provide a method of fabricating a quantum rod polarizer, which uses the aforementioned quantum rod composition to prepare the quantum rod polarizer, with simplified fabricating process, and the prepared quantum rod polarizer has a stable polarizing property.

An objective of the present invention is to further provide a quantum rod polarizer, which has a stable polarizing property, capable of being applied on a liquid crystal display device, raising utilization rate of light source and achieving higher-purity light, thereby implementing a higher color gamut and a lower power consumption of colour display.

To accomplish the above objectives, the present invention provides a quantum rod composition, which comprises photo-alignment-agent modified quantum rods, polymerizable monomers, and a solvent, wherein said photo-alignment-agent modified quantum rods include quantum rods and a photo-alignment agent for modifying around the quantum rods.

A structural formula of said photo-alignment agent is A-Sp-B-Sp-R;

A is —SH, —NH2, —NH—, —COOH, or —CN;

Sp is chemical bond, phenyl group, cycloalkyl group, —O—, —S—, —CO—, —CO—O—, —OCO—, —CH$_2$S—, —CF$_2$O—, —OCF$_2$—, —CF$_2$S—, —(CH$_2$)$_n$—, a group achieved by phenyl group or cycloalkyl group substituting one or a number of atoms C in —(CH$_2$)$_n$—, or a group achieved by atom F substituting one or a number of atom H in —(CH$_2$)$_n$—; wherein n is an integer from 1~4 in said —(CH$_2$)$_n$—;

A structural formula of B is wherein M is a modified group of benzene ring, M is —H, —OH, or —F, ⁓ represents chemical bond;

R is linear or branched chain alkyl having 5~20 atoms C, a group achieved by phenyl group, cycloalkyl group, —CONH—, —COO—, —O—CO—, —S—, —CO— or —CH═CH—substituting one or a number of —CH$_2$— in the linear or branched chain alkyl having 5~20 atoms C, or a group achieved by atom F or Cl substituting one or a number of atoms H in the linear or branched chain alkyl.

Preferably, said photo-alignment agent comprises one or a variety of the following compounds:

Said polymerizable monomers comprise one or a variety of compounds represented by the following four structural formulas:

In the four structural formulas, is benzene ring or naphthenic;

Sp is chemical bond, —(CH$_2$)$_n$—, or a group achieved by —O—, —S—, —CO—, —CO—O—, —O—CO—, —O—CO—O—, —OCH$_2$—, —CH$_2$O—, —CH=CH—, —CF=CF—, —C≡C—, —CH=CH—COO— or —OCO—CH=CH— substituting one or a number of —CH$_2$— in —(CH$_2$)$_n$—; wherein in said —(CH$_2$)$_n$—, n is an integer from 1~8;

P is a polymerizable group which is selected from at least one of methacrylate group, acrylate group, vinyl group, ethyleneoxy group, and epoxide group; in said (P)$_n$, n is the number of polymerizable groups P connected to the same n is an integer from 1~3, when n is greater than 1, the number n of polymerizable groups P are the same or different;

X is substituent, which is selected from —F, —Cl, —Br, —CH$_3$, —CN, linear or branched chain alkyl of 2~8 carbon atoms, or at least one of groups achieved by —O— or —S— substituting one or a number of non-adjacent —CH2- in the linear or branched chain alkyl; in said (X)$_m$, m is the number of substituents X connected to the same m is an integer from 0~3, when m is greater than 1, the number m of substituents X are the same or different.

Preferably, said polymerizable monomers comprise one or a variety of the following compounds:

Said solvent comprises at least one of toluene and benzene; in said quantum rod composition, a total mass percentage of said photo-alignment agent modified quantum rods and the polymerizable monomers is 1%~10%, and a mass ratio of said photo-alignment agent modified quantum rods and the polymerizable monomers is 1:1~50.

The present invention further provides a fabricating method of a quantum rod polarizer, which comprises the following steps of:

step 1, providing the aforementioned quantum rod composition and a substrate;

step 2, uniformly coating said quantum rod composition on the substrate to form a quantum rod film;

step 3, applying linearly polarized light to irradiate said quantum rod film, thereby orienting the photo-alignment agent modified quantum rods in arrangement along the same direction;

step 4, applying UV light to irradiate said quantum rod film, thereby polymerizing the polymerizable monomers in said quantum rod film to form polymer network which is able to anchor said photo-alignment agent modified quantum rods, for retaining arrangement directions thereof; and step 5, implementing heating treatment on said quantum rod film to remove the solvent in said quantum rod film, thereby creating the quantum rod polarizer.

In said step 3, said linearly polarized light is a blue linearly polarized light with a wavelength of 450 nm, illumination of said linearly polarized light is in 80 mW/cm2~100 mW/cm2, and its irradiation time is in 1 min~10 min.

In said step 4, a wavelength of said UV light is in 300 nm~400 nm, illumination of said UV light is in 4 mW/cm2~6 mW/cm2, and its irradiation time is in 20 min~60 min;

In said step 5, temperature of the heating treatment implemented on said quantum rod film is in 120° C.~180° C., and its heating time is in 20 min~40 min.

The present invention further provides a quantum rod polarizer, which is created by applying the aforementioned fabricating method for the quantum rod polarizer, and which comprises the polymer network formed by polymerizing polymerizable monomers, and the photo-alignment agent modified quantum rods anchored within said polymer network and oriented in arrangement along the same direction.

A beneficial effect of the present invention is that: a quantum rod composition provided by the present invention, comprises photo-alignment agent modified quantum rods, polymerizable monomers, and a solvent, said photo-alignment agent modified quantum rods are capable of orienting in arrangement under irradiations of the linearly polarized light, said polymerizable monomers are capable of forming polymer network under irradiation of the UV light, such that said photo-alignment agent modified quantum rods are anchored for retaining arrangement direction thereof. The fabricating method of a quantum rod polarizer, provided by the present invention, applies the aforementioned quantum rod composition to prepare the quantum rod polarizer, with simplified fabricating process. In the fabricated quantum rod polarizer, the photo-alignment agent modified quantum rods are consistent and retained in arrangement directions, and have stable polarizing property. The quantum rod polarizer provided by the present invention, has a stable polarizing property, is capable of being employed within a liquid crystal display device, is capable of raising light source utilization rate and achieving light having greatly higher purity, thereby accomplishing high color gamut and lower power consumption of colour display.

For better realizing the characteristic and the technical context of the present invention, please refer to the detailed description in regard to the present invention with the accompanying drawings, however, the accompanying drawings just for reference and explanation but not for limitation to the present invention.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
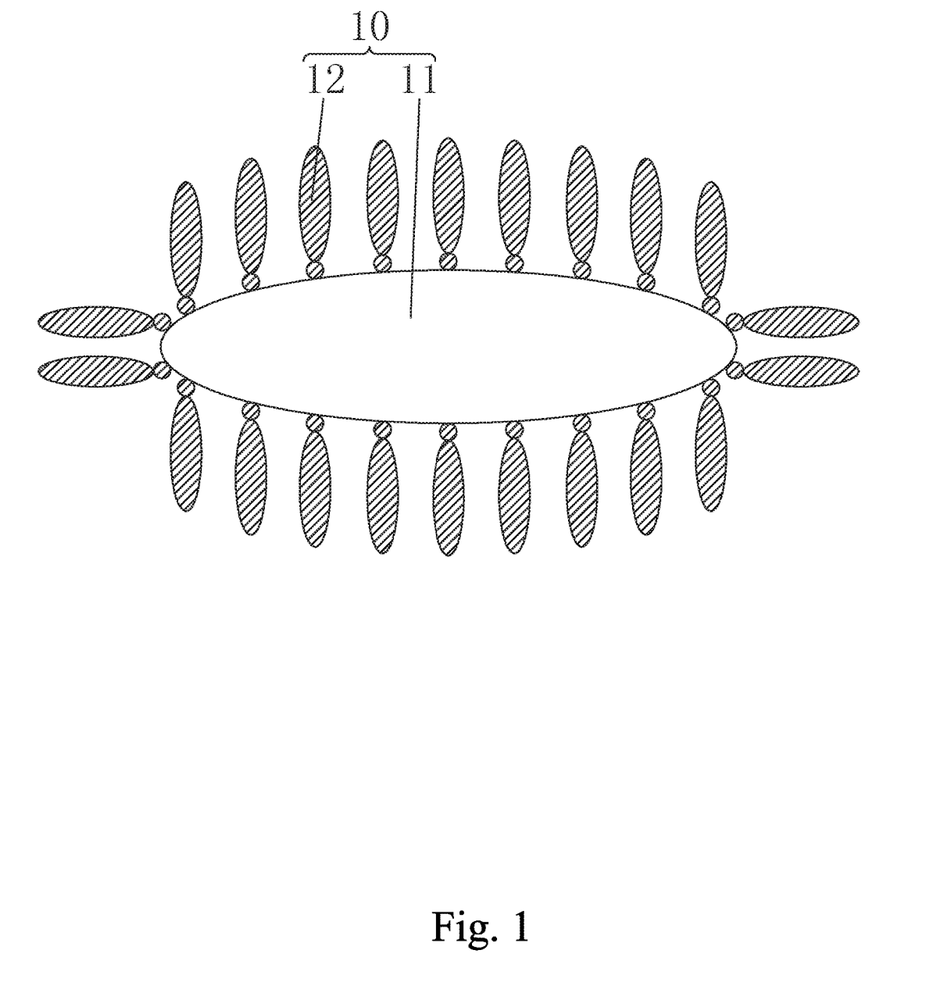
FIG. 1 is a structural schematic diagram of photo-alignment agent modified quantum rod in quantum rod composition of the present invention.
Figure 3:
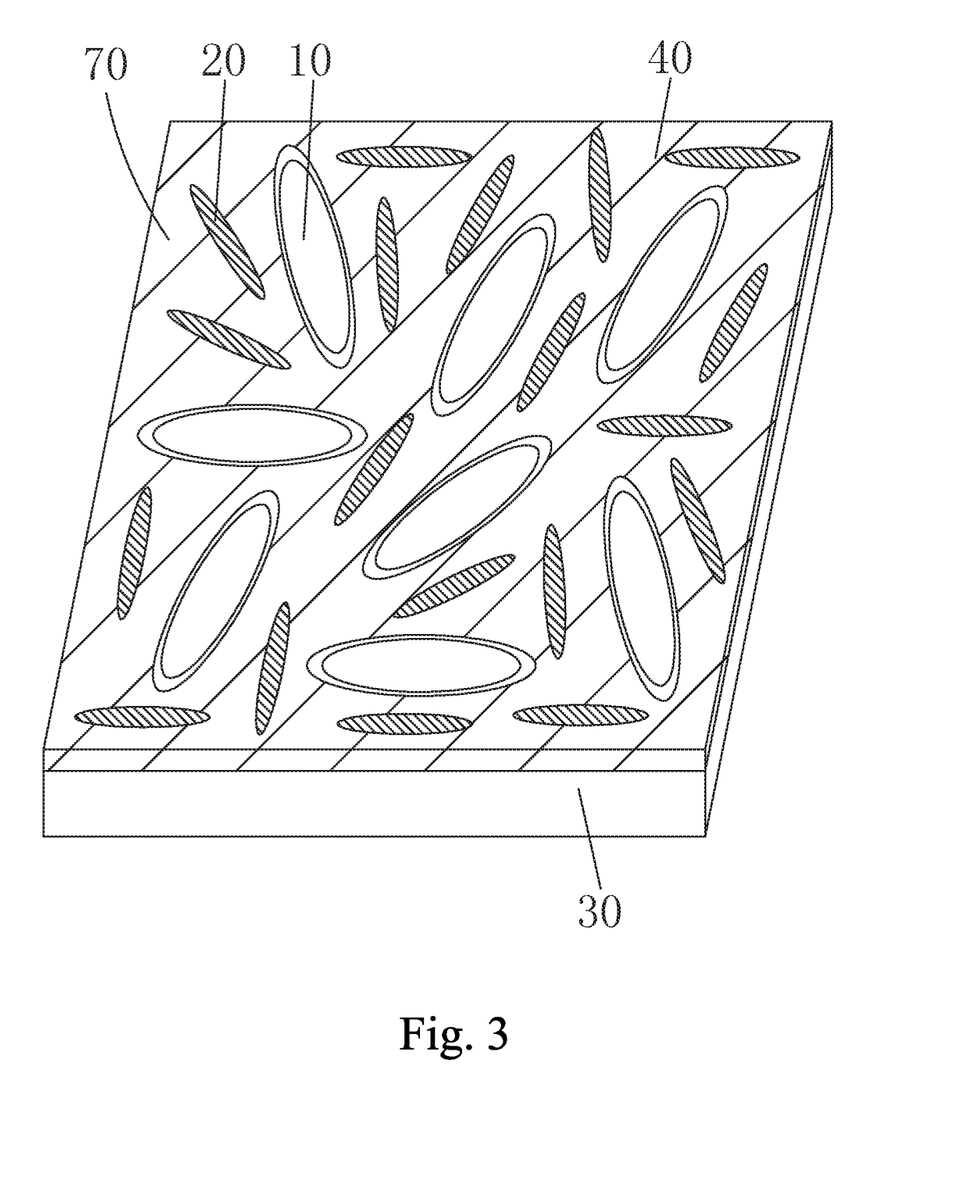
FIG. 3 is a schematic diagram for steps 1~2 of the fabricating method of the quantum rod polarizer of the present invention.

Please refer to FIG. 1 and FIG. 3, the present invention firstly provides a quantum rod composition, which comprises photo-alignment agent modified quantum rods 10, polymerizable monomers 20, and solvent 70; said photo-alignment agent modified quantum rods 10 comprise quantum rods 11, and photo-alignment agent 12 for modifying around the quantum rods 11.

Said photo-alignment agent 12 contains micromolecule material of azo group, and has a structural formula which is A-Sp-B-Sp-R;

A is —SH, —NH$_2$, —NH—, —COOH, or —CN;

Sp is chemical bond, phenyl group, cycloalkyl group, —O—, —S—, —CO—, —CO—O—, —OCO—, —CH$_2$S—, —CF$_2$O—, —OCF$_2$—, —CF$_2$S—, —(CH$_2$)$_n$—, a group achieved by phenyl group or cycloalkyl group substituting one or a number of atoms C in —(CH$_2$)$_n$—, or a group achieved by atom F substituting one or a number of atoms H in —(CH$_2$)$_n$—; wherein n is an integer from 1~4 in said —(CH$_2$)$_n$—;

A structural formula of B is wherein M is a modified group of benzene ring, M is —H, —OH, or —F, ⁓ represents chemical bond;

R is linear or branched chain alkyl having 5~20 atoms C, a group achieved by phenyl group, cycloalkyl group, —CONH—, —COO—, —O—CO—, —S—, —CO— or —CH=CH— substituting one or a number of —$CH_2$— in the linear or branched chain alkyl having 5~20 atoms C, or a group achieved by atom F or Cl substituting one or a number of atoms H in the linear or branched chain alkyl.

Preferably, said photo-alignment agent comprises one or a variety of the following compounds:

Preferably, said quantum rods 11 have core-shell structures.

Specifically, cores of said quantum rods 11 are formed by group II-VI, III-V, I-III-VI or IV-VI semiconductor material. Preferably, cores of said quantum rods 11 are formed by group II-VI semiconductor material, and more preferably, are formed by one or a variety of CdSe, CdS, CdTe, ZnO, ZnSe, ZnS, ZnTe, HgSe, HgTe and CdZnSe.

Specifically, shells of said quantum rods 11 are formed by one or a variety of alloy, oxide and doped materials, and furthermore, shells of said quantum rods 11 can be single layer structures or multi layer structures.

Specifically, said polymerizable monomers 20 comprise one or a variety of acrylate and its derivative, methacrylate and its derivative, styrene and its derivative, epoxy resin and its derivative.

Preferably, said polymerizable monomers 20 comprise one or a variety of compounds represented by the following four structural formulas:

In the aforementioned four structural formulas, is benzene ring or naphthenic;

Sp is chemical bond, —$(CH_2)_n$—, or a group achieved by —O—, —S—, —CO—, —CO—O—, —O—CO—, —O—CO—O—, —$OCH_2$—, —$CH_2O$—, —CH=CH—, —CF=CF—, —C≡C—, —CH=CH—COO— or —OCO—CH=CH— substituting one or a number of —$CH_2$— in —$(CH_2)_n$—; wherein in said —$(CH_2)_n$—, n is an integer from 1~8;

P is a polymerizable group which is selected from at least one of methacrylate group, acrylate group, vinyl group, ethyleneoxy group, and epoxide group; in said $(P)_n$, n is the number of polymerizable groups P connected to the same n is an integer from 1~3, when n is greater than 1, the number n of polymerizable groups P are the same or different;

X is substituent, which is selected from —F, —Cl, —Br, —CH₃, —CN, linear or branched chain alkyl having 2~8 carbon atoms, or at least one of groups achieved by —O— or —S— substituting one or a number of non-adjacent —CH2- in the linear or branched chain alkyl; in said $(X)_m$, m is the number of substituents X connected to the same m is an integer from 0~3, when m is greater than 1, the number m of substituents X are the same or different.

Preferably, said polymerizable monomers 20 comprise one or a variety of the following compounds:

Specifically, said solvent 70 comprises at least one of toluene and benzene.

Specifically, in said quantum rod composition, a total mass percentage of said photo-alignment agent modified quantum rods 10 and the polymerizable monomers 20 is 1%~10%.

Preferably, in said quantum rod composition, a mass ratio of said photo-alignment agent modified quantum rods 10 and the polymerizable monomers 20 is 1:1~50.

The quantum rod composition of the present invention comprises photo-alignment agent modified quantum rods 10, polymerizable monomers 20, and a solvent 70, said photo-alignment agent modified quantum rods 10 are capable of being oriented in arrangement under irradiation of linearly polarized light, said polymerizable monomers 20 are capable of forming polymer network under irradiation of ultraviolet (UV) light, such that said photo-alignment agent modified quantum rods 10 are anchored for retaining arrangement directions thereof. Thus, the quantum rod composition of the present invention can be suitable to fabricate quantum rod polarizer, wherein in the fabricated quantum rod polarizer, the photo-alignment agent modified quantum rods 10 are consistent and retained in the arrangement directions, and have stable polarizing property.

Figure 2:
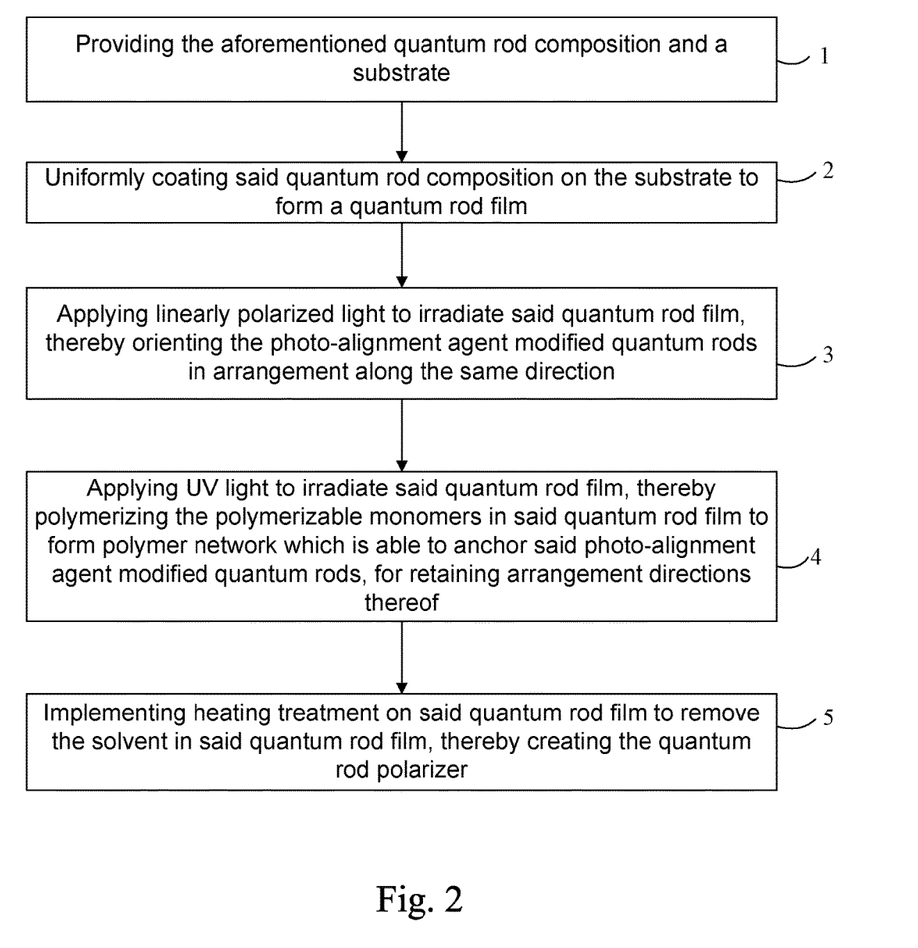
FIG. 2 is a flow chart of a fabricating method of the quantum rod polarizer of the present invention.

Referring to FIG. 2, based on the aforementioned quantum rod composition, the present invention further provides a fabricating method of a quantum rod polarizer, which comprises the following steps.

Step 1, as shown in FIG. 3, providing the aforementioned quantum rod composition and a substrate 30.

Specifically, said substrate 30 is a TFT substrate, CF substrate or mother glass substrate.

Step 2, as shown in FIG. 3, uniformly coating said quantum rod composition on the substrate 30 to form a quantum rod film 40.

Preferably, in said step 2, a spin coating method is applied for uniformly coating said quantum rod composition on the substrate 30.

Figure 4:
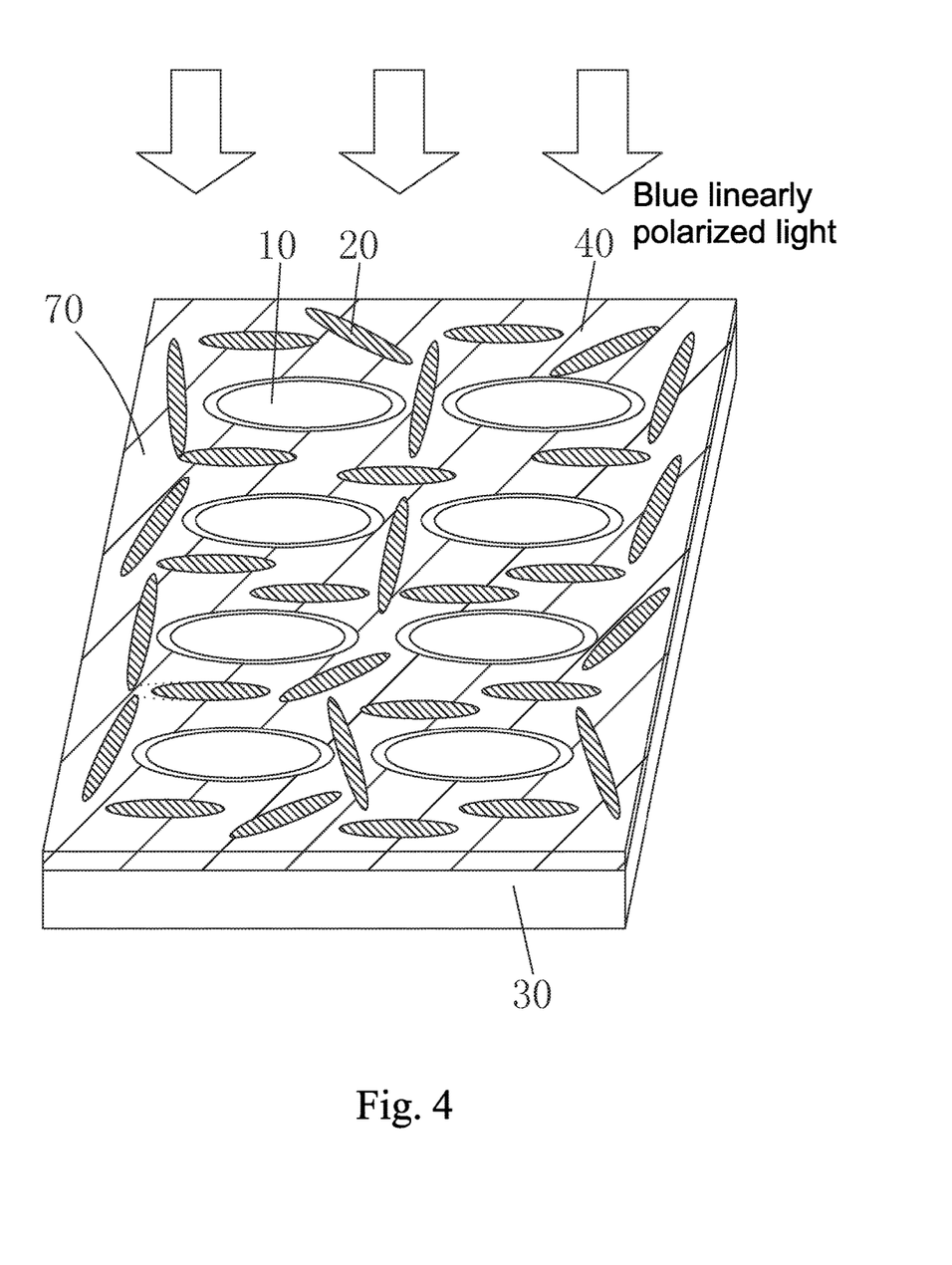
FIG. 4 is a schematic diagram for step 3 of the fabricating method of the quantum rod polarizer of the present invention.

Step 3, as shown in FIG. 4, applying linearly polarized light to irradiate said quantum rod film 40 such that the photo-alignment agent modified quantum rods 10 in said quantum rod film 40 are oriented in arrangement along the same direction.

Specifically, in said step 3, a mechanism of orienting said photo-alignment agent modified quantum rods 10 in arrangement is that: under irradiation of linearly polarized light, the photo-alignment agent 12 in said photo-alignment agent modified quantum rods 10 is oriented in arrangement along a specific direction so as to bring the quantum rods 11, which are modified with the photo-alignment agent 12, into being oriented in arrangement.

Specifically, in said step 3, said linearly polarized light is a blue linearly polarized light with a wavelength of 450 nm, the blue linearly polarized light having the wavelength can induce orientation arrangement of the photo-alignment agent 12 containing azo group and provided by the present invention, thereby leading to the orientation arrangements of said photo-alignment agent modified quantum rods 10.

Preferably, in said step 3, illumination of said linearly polarized light is in 80 mW/cm2~100 mW/cm2, and optionally is 90 mW/cm2, and its irradiation time is in 1 min~10 min.

Figure 5:
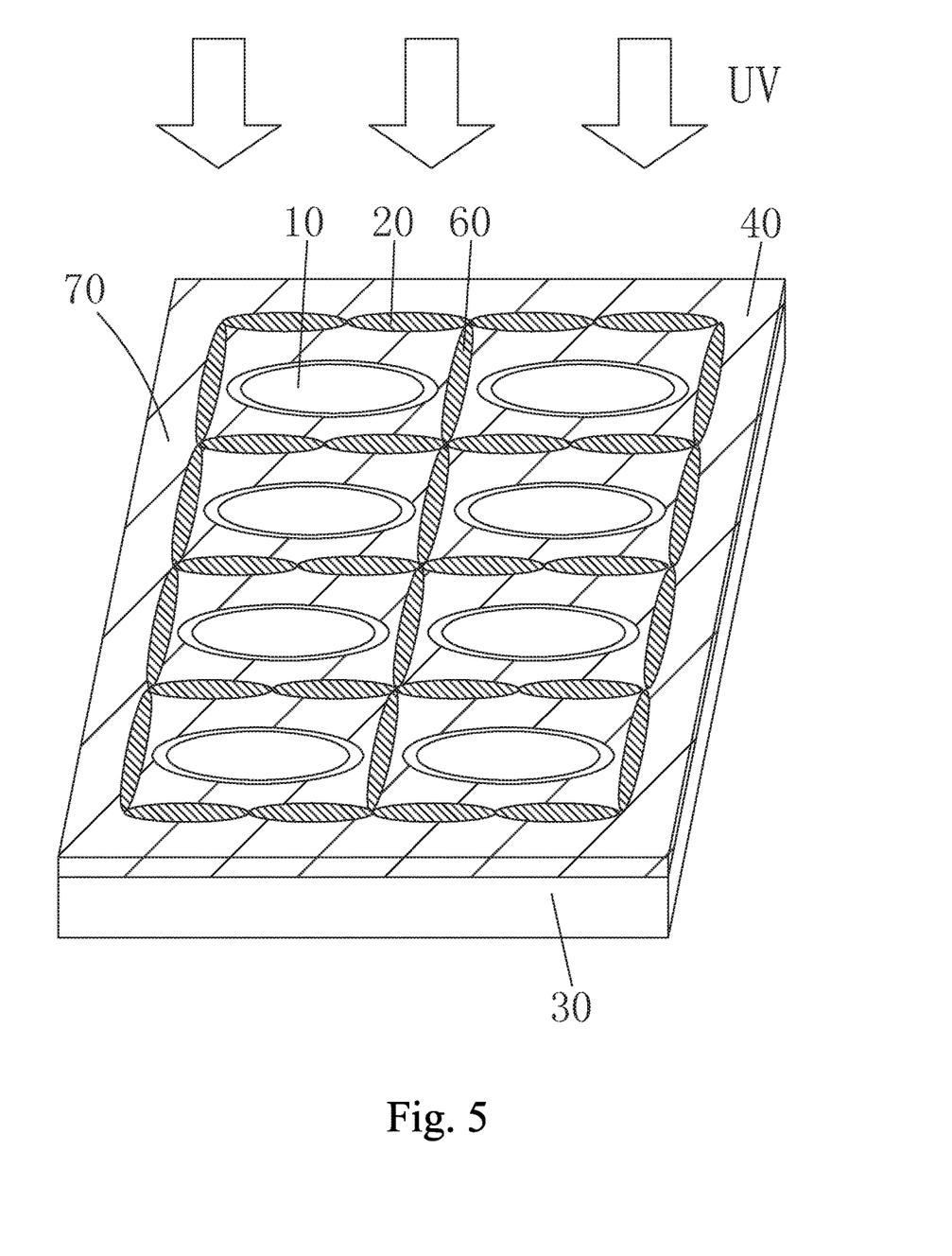
FIG. 5 is a schematic diagram for step 4 of the fabricating method of the quantum rod polarizer of the present invention.

Step 4, as shown in FIG. 5, applying UV light to irradiate said quantum rod film 40, so as to polymerize polymerizable monomers 20 in said quantum rod film 40 to form polymer network 60 which is capable of anchoring said photo-alignment agent modified quantum rods 10, for retaining the arrangement directions thereof.

Specifically, in said step 4, a wavelength of said UV light is in 300 nm~400 nm, and preferably is 310 nm.

Preferably, in said step, illumination of said UV light is in 4 mW/cm2~6 mW/cm2, and its irradiation time is in 20 min~60 min.

Figure 6:
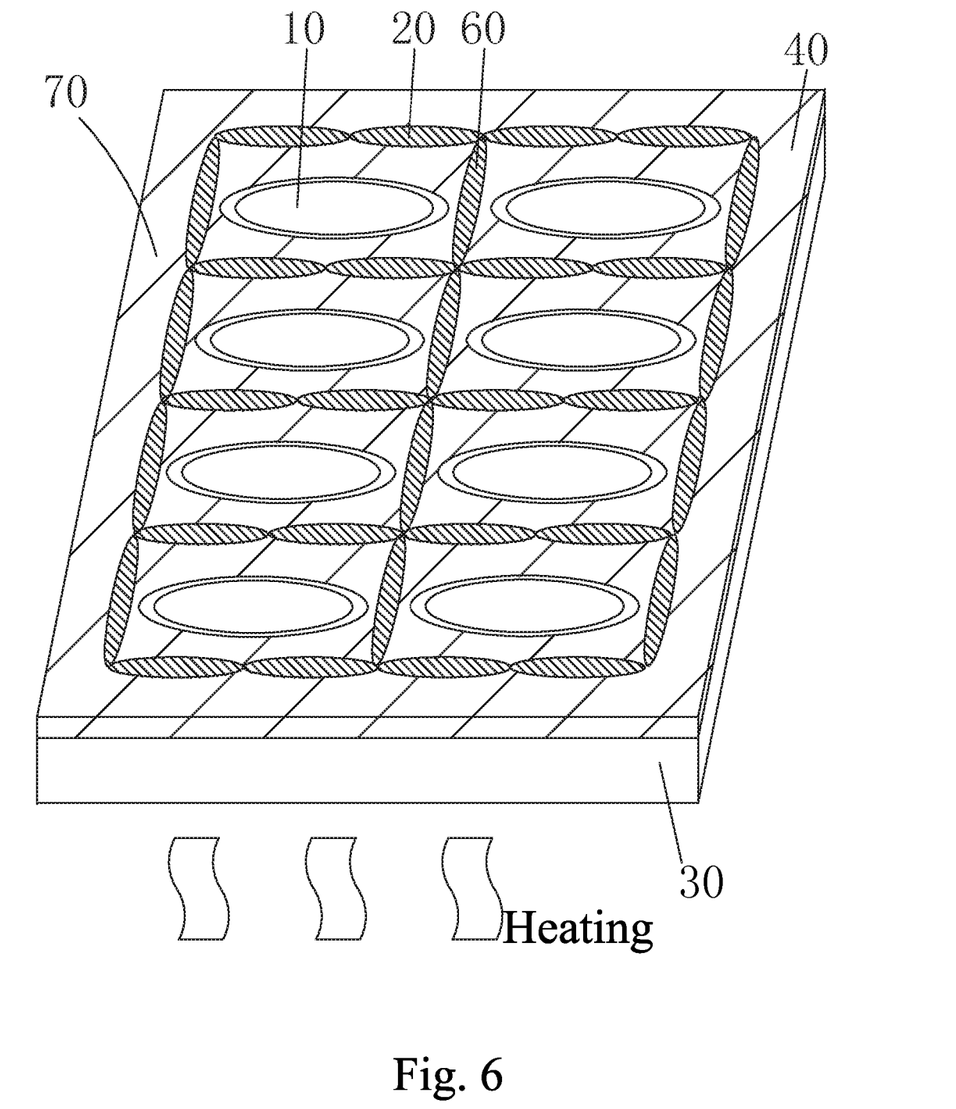
FIGS. 6-7 are schematic diagrams for step 5 of the fabricating method of the quantum rod polarizer of the present invention.
Figure 7:
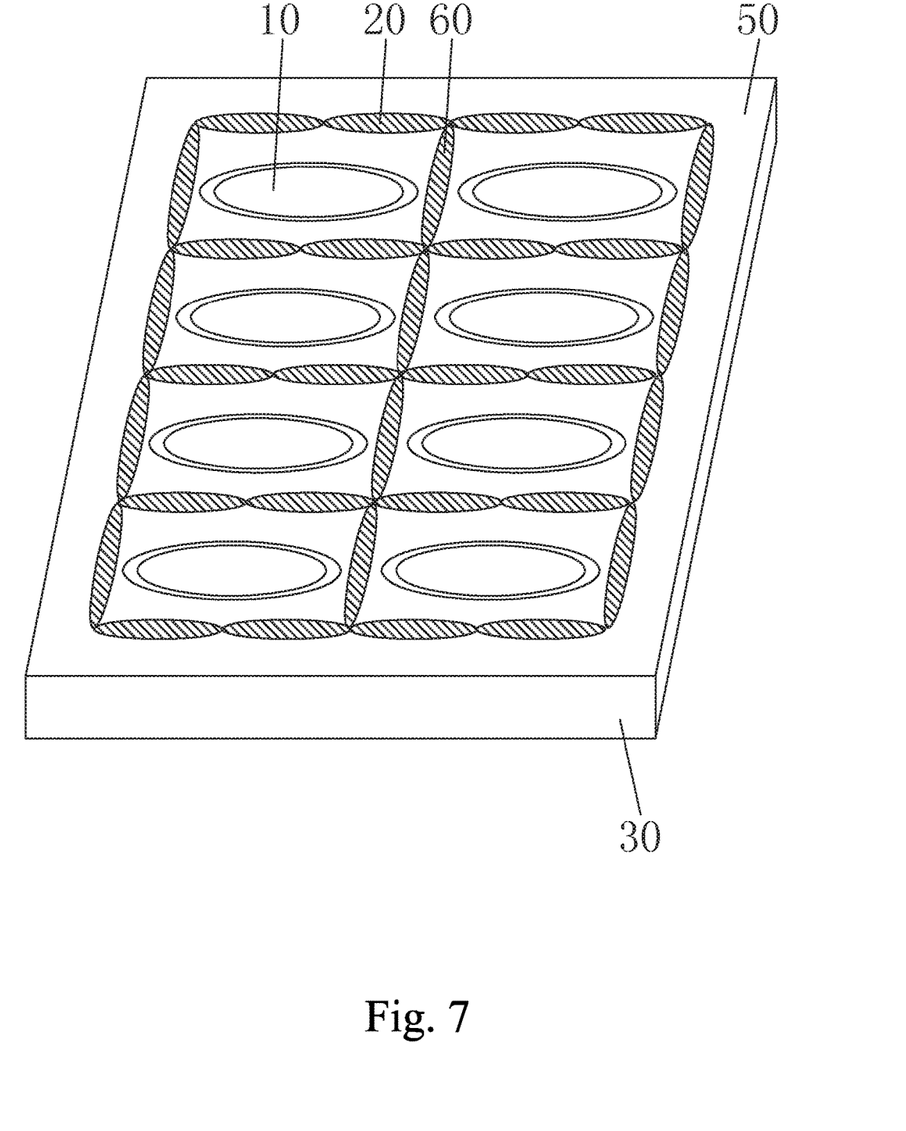

Step 5, as shown in FIGS. 6-7, implementing a heating treatment on said quantum rod film 40 to remove the solvent 70 in said quantum rod film 40, for creating the quantum rod polarizer 50.

Specifically, in said step 5, a temperature of implementing the heating treatment on said quantum rod film 40 is in 120° C.~180° C., and its heating time is in 20 min~40 min.

The fabricating method of the quantum rod polarizer of the present invention, applies the aforementioned quantum rod composition to prepare the quantum rod polarizer 50 with a simplified fabricating process, wherein in the fabricated quantum rod polarizer 50, the photo-alignment agent modified quantum rods 10 are consistent and retained in arrangement directions, and have stable polarizing property.

Figure 8:
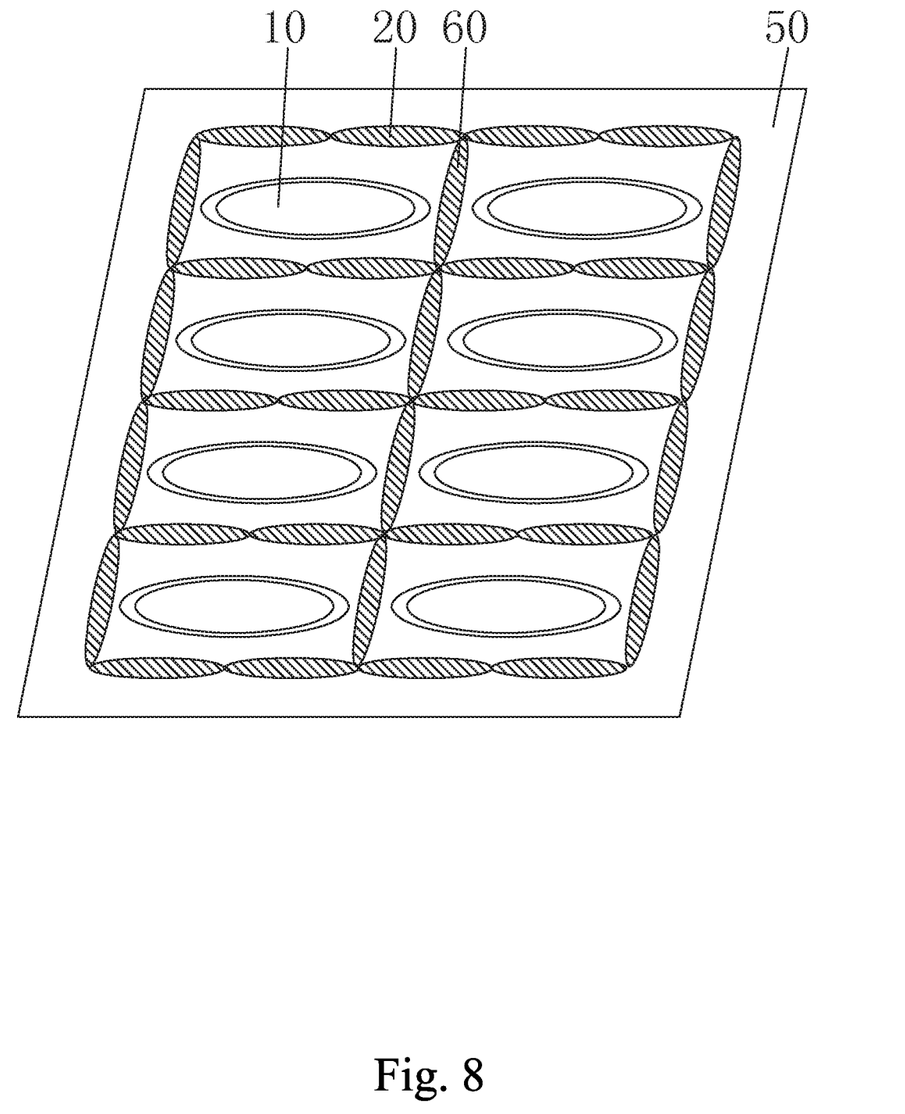
FIG. 8 is a structural schematic diagram of the quantum rod polarizer of the present invention.

Referring to FIG. 8, based on the fabricating method of the aforementioned quantum rod polarizer, the present invention further provides a quantum rod polarizer 50 fabricated by applying the aforementioned method, which comprises polymer network 60 formed by polymerizing polymerizable monomers 20, and the photo-alignment agent modified quantum rods 10 anchored within said polymer network 60 and oriented in arrangement along the same direction.

Preferably, the quantum rods 11 in said photo-alignment agent modified quantum rods 10 comprise red light quantum rods, green light quantum rods and blue light quantum rods. Therefore, while the quantum rod polarizer 50 of the present invention is suffered with backlight irradiation, the light emitted therefrom are white linearly polarized light, which is produced by mixing red linearly polarized light, green linearly polarized light, and blue linearly polarized light, capable of being applied on the conventional liquid crystal display device to substitute a conventional lower polarizer, and cooperating with a color filter for use, thereby implementing colour display.

The quantum rod polarizer of the present invention where the photo-alignment agent modified quantum rods 10 are consistent and retained in arrangement directions thereof, is capable of absorbing and conversed the backlight into linearly polarized light with uniform polarization direction, has a stable polarizing property, is capable of being applied on the liquid crystal display device with substituting a lower polarizer. Compared with the conventional filtering type lower polarize, the quantum rod polarizer of the present invention, by introducing quantum rod material, can raise light source utilization rate and achieve greatly higher purity light, thereby implementing high color gamut and lower power consumption of the colour display.

In summary, the present invention provides a quantum rod composition, a quantum rod polarizer and a fabricating method for the same. The quantum rod composition of the present invention comprises the photo-alignment agent modified quantum rods, the polymerizable monomers, and a solvent, said photo-alignment agent modified quantum rods are capable of being oriented in arrangement under irradiation of linearly polarized light, said polymerizable monomers are capable of forming polymer network under irradiation of UV light, thereby anchoring said photo-alignment agent modified quantum rods, for retaining arrangement directions thereof. The fabricating method of the quantum rod polarizer of the present invention, applies the aforementioned quantum rod composition to prepare the quantum rod polarizer with simplified fabricating process. In the fabricated quantum rod polarizer, the photo-alignment agent modified quantum rods are consistent and retained in arrangement directions, and have stable polarizing property. The quantum rod polarizer of the present invention makes polarizing property stable, is capable of being applied on the liquid crystal display device, is capable of raising light source utilization rate and achieving greatly higher purity light, thereby implementing high color gamut and lower power consumption of colour display.

As above mentioned, in accordance with technical embodiments and technical solution of the present invention, to any persons who are ordinary skilled in the art, other related change or variances can be made which should be covered by the protected scope of the subject claims attached below by the present invention.

What is claimed is:

1. A quantum rod composition, comprising photo-alignment agent modified quantum rods, polymerizable monomers, and a solvent; said photo-alignment agent modified quantum rods comprising quantum rods, and photo-alignment agent for modifying around the quantum rods.

2. The quantum rod composition as claimed in claim 1, wherein a structural formula of said photo-alignment agent is A-Sp-B-Sp-R;

A is —SH, —NH$_2$, —NH—, —COOH, or —CN;

Sp is chemical bond, phenyl group, cycloalkyl group, —O—, —S—, —CO—, —CO—O—, —OCO—, —CH$_2$S—, —CF$_2$O—, —OCF$_2$—, —CF$_2$S—, —(CH$_2$)$_n$—, a group achieved by phenyl group or cycloalkyl group substituting one or a number of atoms C in —(CH$_2$)$_n$—, or a group achieved by atom F substituting one or a number of atoms H in —(CH$_2$)$_n$—; wherein n is an integer from 1~4 in said —(CH$_2$)$_n$—;

a structural formula of B is wherein M is a modified group of benzene ring, M is —H, —OH, or —F, ∿∿∿ represents chemical bond;

R is linear or branched chain alkyl having 5~20 atoms C, a group achieved by phenyl group, cycloalkyl group, —CONH—, —COO—, —O—CO—, —S—, —CO— or —CH═CH— substituting one or a number of —CH$_2$— in the linear or branched chain alkyl having 5~20 atoms C, or a group achieved by atom F or Cl substituting one or a number of atoms H in the linear or branched chain alkyl.

3. The quantum rod composition as claimed in claim 2, wherein said photo-alignment agent comprises one or a variety of the following compounds:

4. The quantum rod composition as claimed in claim 1, wherein said polymerizable monomers comprise one or a variety of compounds represented by the following four structural formulas:

In the aforementioned four structural formulas, is benzene ring or naphthenic;
Sp is chemical bond, —(CH$_2$)$_n$—, or a group achieved by —O—, —S—, —CO—, —CO—O—, —O—CO—, —O—CO—O—, —OCH$_2$—, —CH$_2$O—, —CH═CH—, —CF═CF—, —C≡C—, —CH═CH—COO— or —OCO—CH═CH— substituting one or a number of —CH$_2$— in —(CH$_2$)$_n$—; wherein in said —(CH$_2$)$_n$—, n is an integer from 1~8;

P is a polymerizable group which is selected from at least one of methacrylate group, acrylate group, vinyl group, ethyleneoxy group, and epoxide group; in said (P)$_n$, n is the number of polymerizable groups P connected to the same n is an integer from 1~3, when n is greater than 1, the number n of polymerizable groups P are the same or different;

X is substituent which is selected from —F, —Cl, —Br, —CH$_3$, —CN, linear or branched chain alkyl having 2~8 carbon atoms, or at least one of groups achieved by —O— or —S— substituting one or a number of non-adjacent —CH2- in the linear or branched chain alkyl; in said (X)$_m$, m is the number of substituents X connected to the same, m is an integer from 0~3, when m is greater than 1, the number m of substituents X are the same or different.

5. The quantum rod composition as claimed in claim 4, wherein said polymerizable monomers comprise one or a variety of the following compounds:

-continued

, and

6. The quantum rod composition as claimed in claim 1, wherein said solvent comprises at least one of toluene and benzene; in said quantum rod composition, a total mass percentage of said photo-alignment agent modified quantum rods and the polymerizable monomers is 1%~10%, and a mass ratio of said photo-alignment agent modified quantum rods and the polymerizable monomers is 1:1~50.

7. A fabricating method of a quantum rod polarizer, which comprises the following steps of:
   step 1, providing the quantum rod composition as claim in claim 1, and a substrate;
   step 2, uniformly coating said quantum rod composition on the substrate to form a quantum rod film;
   step 3, applying linearly polarized light to irradiate said quantum rod film, thereby orienting the photo-alignment agent modified quantum rods in arrangement along the same direction;
   step 4, applying UV light to irradiate said quantum rod film, thereby polymerizing the polymerizable monomers in said quantum rod film to form polymer network which is able to anchor said photo-alignment agent modified quantum rods, for retaining arrangement directions thereof; and
   step 5, implementing heating treatment on said quantum rod film to remove the solvent in said quantum rod film, thereby creating the quantum rod polarizer.

8. The fabricating method of the quantum rod polarizer as claimed in claim 7, wherein in said step 3, said linearly polarized light is a blue linearly polarized light with a wavelength of 450 nm, illumination of said linearly polarized light is in 80 mW/cm2~100 mW/cm2, and its irradiation time is in 1 min~10 min.

9. The fabricating method of the quantum rod polarizer as claimed in claim 7, wherein in said step 4, a wavelength of said UV light is in 300 nm~400 nm, illumination of said UV light is in 4 mW/cm2~6 mW/cm2, and its irradiation time is in 20 min~60 min; and
   in said step 5, a temperature of the heating treatment implemented on said quantum rod film is in 120° C.~180° C., and its heating time is in 20 min~40 min.

10. A quantum rod polarizer, which is created by applying the fabricating method of the quantum rod polarizer as claimed in claim 7, comprising the polymer network formed by polymerizing polymerizable monomers, and the photo-alignment agent modified quantum rods anchored within said polymer network and oriented in arrangement along the same direction.

* * * * *